(12) United States Patent
Kim

(10) Patent No.: US 11,262,151 B2
(45) Date of Patent: Mar. 1, 2022

(54) SHOOTING SYSTEM

(71) Applicant: HANWHA DEFENSE CO., LTD., Changwon-si (KR)

(72) Inventor: Soo Young Kim, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 0 days.

(21) Appl. No.: 16/901,080

(22) Filed: Jun. 15, 2020

(65) Prior Publication Data
US 2021/0278163 A1 Sep. 9, 2021

(30) Foreign Application Priority Data
Mar. 3, 2020 (KR) ........................ 10-2020-0026801

(51) Int. Cl.
| F41A 27/22 | (2006.01) |
| F41A 27/02 | (2006.01) |
| G06K 9/00 | (2022.01) |
| H04N 7/18 | (2006.01) |

(52) U.S. Cl.
CPC .............. *F41A 27/22* (2013.01); *F41A 27/02* (2013.01); *G06K 9/00664* (2013.01); *H04N 7/183* (2013.01)

(58) Field of Classification Search
CPC .......... F41A 27/22; F41A 27/00; F41A 27/02; F41A 27/04; F41A 27/06; F41A 27/20; F41A 27/18; F41A 27/24; F41A 27/26; F41A 27/28; F41A 27/30
USPC ........... 89/40.01, 37.01, 37.03, 37.04, 37.07, 89/37.08, 37.09, 40.03, 40.04, 40.05, 89/40.09, 40.11, 40.13, 41.01, 41.02, 89/41.03, 41.05, 41.07, 41.09, 41.11, 89/41.12, 41.15, 41.16, 41.17, 41.18
See application file for complete search history.

(56) References Cited

U.S. PATENT DOCUMENTS

| 5,379,676 A * | 1/1995 | Profeta ..................... F41G 3/02 89/41.05 |
| 5,686,690 A * | 11/1997 | Lougheed ............... F41A 17/08 348/155 |
| 7,210,392 B2 * | 5/2007 | Greene ................... F41A 23/24 89/41.03 |
| 8,833,231 B1 * | 9/2014 | Venema .................... F41G 3/16 89/41.07 |
| 8,833,232 B1 * | 9/2014 | Fox .......................... F41H 5/266 89/41.07 |
| 9,372,053 B2 * | 6/2016 | De Sa ..................... F41G 7/007 |
| 9,523,548 B2 * | 12/2016 | Fox ............................. F41G 3/06 |

(Continued)

FOREIGN PATENT DOCUMENTS

| JP | 2019-8531 A | 1/2019 |
| KR | 10-2005-0056092 A | 6/2005 |

(Continued)

*Primary Examiner* — John Cooper
(74) *Attorney, Agent, or Firm* — Sughrue Mion, PLLC

(57) ABSTRACT

A shooting system includes a platform, a gun installed on the platform, a manipulator connected to the platform and the gun and configured to move the platform, a platform driver configured to drive the manipulator, and a controller configured to control the platform driver to drive the manipulator to move the platform based on transmitting a movement control signal to the platform driver, and determine whether the gun is unable to aim at a target.

10 Claims, 12 Drawing Sheets

(56) References Cited

U.S. PATENT DOCUMENTS 10,557,683 B1 * 2/2020 Staffetti .................... F41G 3/04
2016/0047618 A1 * 2/2016 Fox .......................... F41G 3/10
                                                              89/41.02

FOREIGN PATENT DOCUMENTS

KR     10-2010-0102373 A    9/2010
KR          10-1697618 B1   1/2017

* cited by examiner

SHOOTING SYSTEM

CROSS-REFERENCE TO THE RELATED APPLICATION

This application is based on and claims priority Korean Patent Application No. 10-2020-0026801, filed on Mar. 3, 2020, in the Korean Intellectual Property Office, the disclosure of which is incorporated by reference herein in its entirety.

BACKGROUND

1. Field

One or more embodiments relate to a shooting system, and more particularly, to a shooting system in which a gun is installed on a platform.

2. Description of Related Art

In a shooting system, such as a tank, a gun is installed on a platform, which functions as a protection room, and a manipulator is connected to the gun. The manipulator is driven by a gun barrel driver and a shooting driver. A mounting device of a gun may be a part of the manipulator installed on the platform, and the mounting device moves in vertical directions or rotates with the gun. Here, the operating range in which the mounting device moves or rotates is limited.

In the shooting system as described above, various situations in which the gun is unable to aim at a target may occur while the gun is shooting. In this case, the shooting cannot be continued and must be stopped.

SUMMARY

One or more embodiments include a shooting system capable of quickly resolving various situations in which a gun is unable to aim at a target that may occur while the gun is shooting.

Additional aspects will be set forth in part in the description which follows and, in part, will be apparent from the description, or may be learned by practice of the presented embodiments of the disclosure.

According to an embodiment, there is provided a shooting system including a platform; a gun installed on the platform; a manipulator connected to the platform and the gun, and configured to move the platform; a platform driver configured to drive the manipulator; and a controller configured to: control the platform driver to drive the manipulator to move the platform based on transmitting a movement control signal to the platform driver; and determine whether the gun is unable to aim at a target.

The shooting system further includes: a user interface configured to receive an input command from a user and transmit a command signal corresponding to the input command to the controller; a gun barrel driver configured to drive the manipulator based on a gun barrel control signal from the controller, such that the manipulator moves a barrel of the gun in a vertical axis (Z-axis) direction or rotates about the vertical axis (Z-axis); and a shooting driver configured to drive the manipulator based on a shooting control signal from the controller, such that the manipulator controls the gun to shoot according to the shooting control signal.

The shooting system further includes: a camera connected to the gun and configured to capture an image ahead of the gun and transmit the image ahead of the gun to the controller; and a display configured to display the image ahead of the gun according to a display control signal from the controller, where, based on the input command from the user interface, the controller is configured to determine the target based on the image ahead of the gun and transmit the gun barrel control signal to the gun barrel driver to control the gun to shoot the target.

The controller is further configured to: determine that the gun is unable to aim at the target based on determining that a movement of the barrel of the gun is stopped or about to be stopped by a mechanically movement-restricted area while the barrel of the gun is moving in the vertical axis (Z-axis) direction, and transmit the movement control signal to the platform driver, such that the platform is raised or lowered in a direction in which the barrel of the gun is moved.

The controller is further configured to: determine that the gun is unable to aim at the target based on determining that a rotation of the barrel of the gun is stopped or about to be stopped by a mechanically rotation-restricted area while the barrel of the gun is rotating clockwise or counterclockwise about the vertical axis (Z-axis), and transmit the movement control signal to the platform driver, such that the platform rotates in a direction in which the barrel of the gun rotated.

The controller is further configured to: determine that the gun is unable to aim at the target based on determining that at least a portion of an obstacle image overlaps or is about to overlap with a target area image that is set to be larger than a target image, and transmit the movement control signal to the platform driver, such that at least the portion of the obstacle image does not overlap the target area image.

An obstacle is an external obstacle or an internal obstacle, and the internal obstacle is a structure installed on the platform.

When the obstacle is the internal obstacle, the controller is further configured to transmit the movement control signal, such that the platform rotates by a first set angle around the vertical axis (Z-axis).

The controller is further configured to: based on determining that an image of the internal obstacle overlaps or is about to overlap a right portion of the target area image, transmit the movement control signal to the platform driver, such that the platform rotates clockwise by a second set angle around the vertical axis (Z-axis), and based on determining that the image of the internal obstacle overlaps or is about to overlap a left portion of the target area image, transmit the movement control signal to the platform driver, such that the platform rotates counterclockwise by the second set angle around the vertical axis (Z-axis).

The controller is further configured to transmit the gun barrel control signal to the gun barrel driver, such that the barrel of the gun is rotated in a direction opposite to a rotation direction of the platform and at the same speed as a rotation speed of the platform.

When the obstacle is the external obstacle, the controller is further configured to transmit the movement control signal to the platform driver, such that the platform moves in at least one of a vertical axis (Z-axis) direction, a sagittal axis (X-axis) direction, or a traverse axis (Y-axis) direction.

The controller is further configured to: based on determining that an image of the external obstacle overlaps or is about to overlap a left portion of the target area image, transmit the movement control signal to the platform driver, such that the platform moves to the right, and based on determining that the image of the external obstacle overlaps or is about to overlap a right portion of the target area image, transmit the movement control signal to the platform driver, such that the platform moves to the left.

The controller is further configured to: based on determining that an image of the external obstacle covers or is about to cover an entire image, transmit the movement control signal to the platform driver, such that the platform moves backward, and based on determining that the image of the external obstacle covers or is about to cover an entire target area image, transmit the movement control signal to the platform driver, such that the platform rises.

The controller is further configured to: based on determining that an image of the external obstacle overlaps or is about to overlap a left portion of the target area image, transmit the movement control signal to the platform driver, such that the platform rotates counterclockwise by a third set angle around the vertical axis (Z-axis) after the platform is moved to the right, and based on determining that the image of the external obstacle overlaps or is about to overlap a right portion of the target area image, transmit the movement control signal to the platform driver, such that the platform rotates clockwise by the third set angle around the vertical axis (Z-axis) after the platform is moved to the left.

The manipulator includes a mount device connected to a barrel of the gun and configured to rotate the barrel of the gun in a vertical axis (Z-axis) or about the vertical axis (Z-axis).

The controller is further configured to, based on determining that the platform is rotated at about the vertical axis (Z-axis) and the barrel of the gun is rotated with the platform so as to pass the target, transmit the gun barrel control signal to the gun barrel driver to rotate the barrel of the gun rotate in an opposite direction from a direction which the platform is rotated.

The shooting system further includes a gyro sensor configured to measure an angular velocity of a barrel of the gun and a tilt sensor configured to measure an inclination of the platform with respect to a ground.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
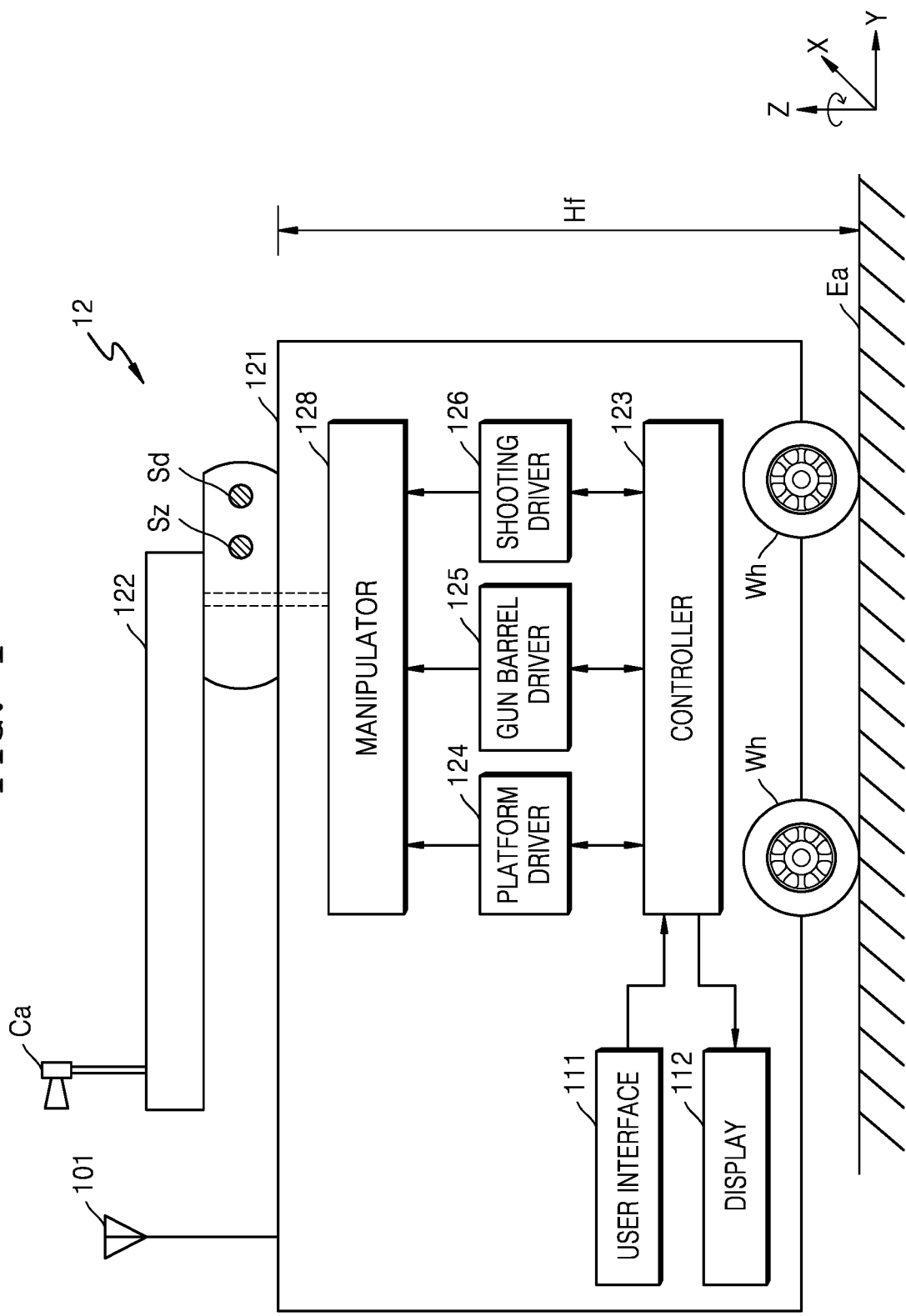
FIG. 1 is a diagram showing a shooting system according to an embodiment.

Reference will now be made in detail to embodiments, examples of which are illustrated in the accompanying drawings, where like reference numerals refer to like elements. Embodiments may have different forms and should not be construed as limiting the scope of the disclosure. Accordingly, the embodiments are described below, by referring to the accompanying drawings, to explain various aspects of the disclosure. As used herein, the term "and/or" may include any and all combinations of one or more of the associated items.

The following description and the accompanying drawings are intended to help understand the operation according to one or more embodiments, and parts that may be easily implemented by one of ordinary skill in the art.

In addition, the embodiments are not provided for the purpose of limiting one or more embodiments, but to describe various features, aspects and advantages the embodiments. The terms used in the disclosure should be interpreted as meanings and concepts consistent with the technical spirit of one or more embodiments in order to represent one or more embodiments.

Hereinafter, one or more embodiments will be described in detail with reference to the accompanying drawings.

FIG. 1 is a diagram showing a shooting system 12 according to an embodiment. In FIG. 1, the shooting system may include a gyro sensor Sz that measures the angular velocity of a barrel of a gun 122, a tilt sensor Sd that measures the inclination of a platform 121, a plurality of wheels Wh, and a plurality of antennas 101 installed on the platform 121. In FIG. 1, Ea denotes the ground, Hf denotes the height of the platform, X denotes the traverse axis, Y denotes the sagittal axis, and Z denotes the vertical axis.

Referring to FIG. 1, the shooting system 12 may include a platform 121, a gun 122, a manipulator 128, a platform driver 124, a controller 123, a user interface 111, a gun barrel driver 125, a shooting driver 126, a camera Ca, and a display 112. Further, it is noted that at least one of these components may be embodied as various numbers of hardware, software and/or firmware structures that execute respective functions described below. For example, at least one of these components may use a direct circuit structure, such as a memory, an internal processor such as a microprocessor, a logic circuit, a look-up table, etc. that may execute the respective functions through controls of the controller 123 that may include a central processing unit (CPU). Also, at least one of these components may be specifically embodied by a module, a program, or a part of code, which contains one or more executable instructions for performing the respective functions, and executed by the controller 123.

The platform 121 may be moved. The gun 122 is installed on the platform 121. The manipulator 128 is connected to the platform 121 and the gun 122.

The platform driver 124 drives the manipulator 128, such that the platform 121 moves according to movement control signals from the controller 123. Here, the controller 123 may transmit control signals to the platform driver 124 to drive the manipulator 128.

While the gun 122 is shooting at a target, when the controller 123 determines that the gun 122 becomes unable to aim the target, the controller 123 provides the movement control signals to the platform driver 124 to resolve a situation that the gun 122 is unable to aim the target. Detailed descriptions thereof will be given below with reference to FIGS. 2 to 12.

According to an embodiment, while the gun 122 is shooting, when a situation in which the gun 122 is unable to aim at the target occurs, the situation may be automatically and quickly resolved by appropriately moving the platform 121. That is, when it is confirmed that various situations make the gun 122 unable to aim at a target, the platform 121 may be appropriately moved to resolve such situations. Therefore, the shooting system 12, even when a situation in which it is unable to aim at the target occurs while shooting, may quickly adjust its aim at the target and continue the shooting operation without being interrupted.

The user interface 111 receives a user command from a user and transmits corresponding signals to the controller 123.

The gun barrel driver 125 receives control signals from the controller 123 and drives the manipulator 128 according to the received control signal. Here, the controller 123 may transmit a control signal to the barrel driver 125 so as to control the barrel driver 125 to move a barrel of the gun 122 in the vertical axis (Z-axis) direction or rotate clockwise or counterclockwise around the vertical axis (Z-axis).

For example, a portion of the manipulator 128 connected to the gun barrel driver 125 may be a mount device of the gun 122. Due to the mounting device, the barrel of the gun 122 moves in the vertical axis (Z-axis) direction or rotates clockwise or counterclockwise around the vertical axis (Z-axis). Here, the operating range in which the mounting device moves or rotates may be limited.

The shooting driver 126 drives the manipulator 128 according to shooting control signals from the controller 123. That is, the controller 123 may transmit a control signal to the shooting driver 126 such that the shooting driver 126 controls the gun 122 to fire at a target.

The camera Ca is connected to the gun 122 and captures images ahead of the gun and transmits the captured images to the controller 123.

The display 112 displays the images ahead of the gun under the control of the controller 123.

According to user command signals received by the user interface 111 and images captured by the camera Ca, the controller 123 may input the gun barrel control signals to the gun barrel driver 125 and recognize the target, which is to be shot at, in the images ahead of the gun 122 while inputting the shooting control signals to the shooting driver 126.

Figure 2:
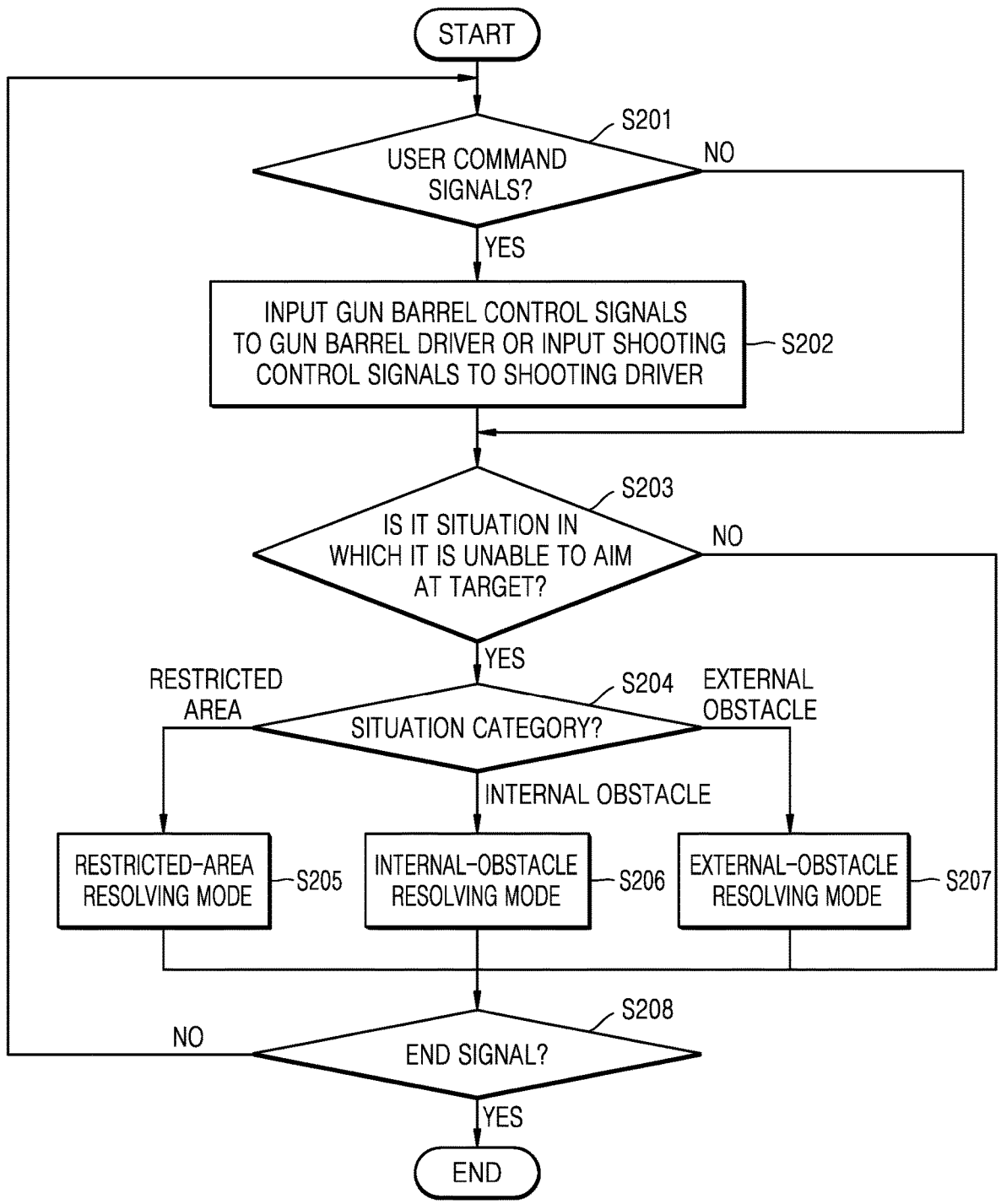
FIG. 2 is a flowchart showing a control operation of a controller according to an embodiment.

FIG. 2 is a flowchart showing a control operation of a controller according to an embodiment. Detailed descriptions thereof will be given below with reference to FIGS. 1 and 2.

According to user command signals from the user interface 111, the controller 123 inputs the gun barrel control signals to the gun barrel driver 125 or recognizes the target, which is to be shot at, in the images ahead of the gun 122 while inputting the shooting control signals to the shooting driver 126 (operations S201 and S202).

Also, when it is determined that the gun 122 is unable to aim the target while the gun 122 is shooting, the controller 123 determines the category of the case in which the gun 122 is unable to aim the target (operations S203 and S204).

According to an embodiment, there may be at least three categories of situations in which the gun 122 is unable to aim the target. Here, the embodiment describes three modes for resolving such cases. When the situation is due to a restricted area, a restricted-area resolving mode is performed (operation S205). When the situation is due to an internal obstacle, an internal-obstacle resolving mode may be performed (operation S206). When the situation is due to an external obstacle, an external-obstacle resolving mode may be performed (operation S207). The three categories and the three resolving modes will be described below in detail with reference to FIGS. 3 to 12.

Operations S201 to S207 are repeatedly performed until an end signal occurs (operation S208).

Figure 3:
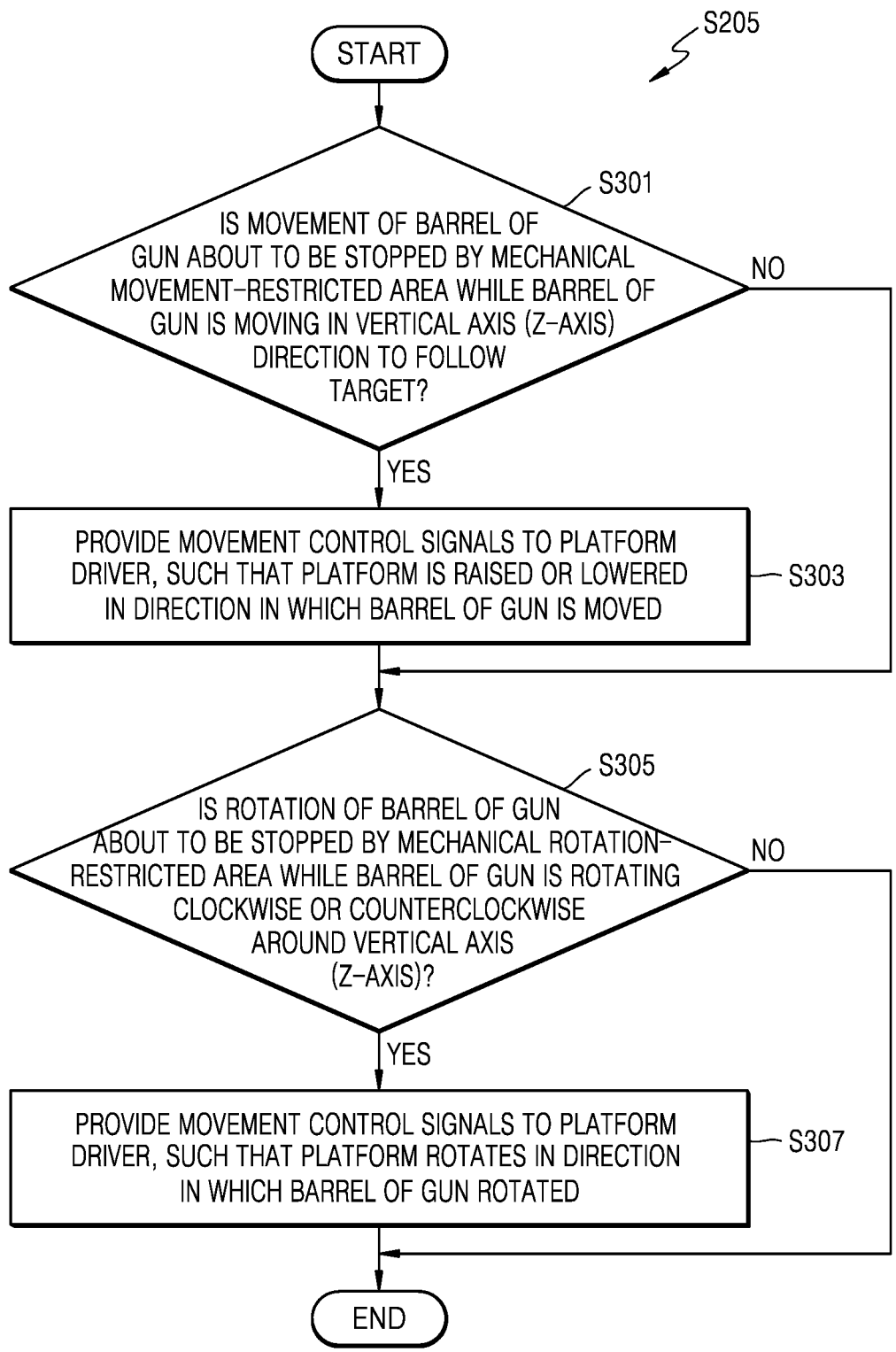
FIG. 3 is a flowchart showing the detailed operation of a restricted-area resolving mode of operation S205 in FIG. 2 according to an embodiment.

FIG. 3 is a diagram showing the detailed operation of the restricted-area resolving mode in FIG. 2 (operation S205).

Figure 4:
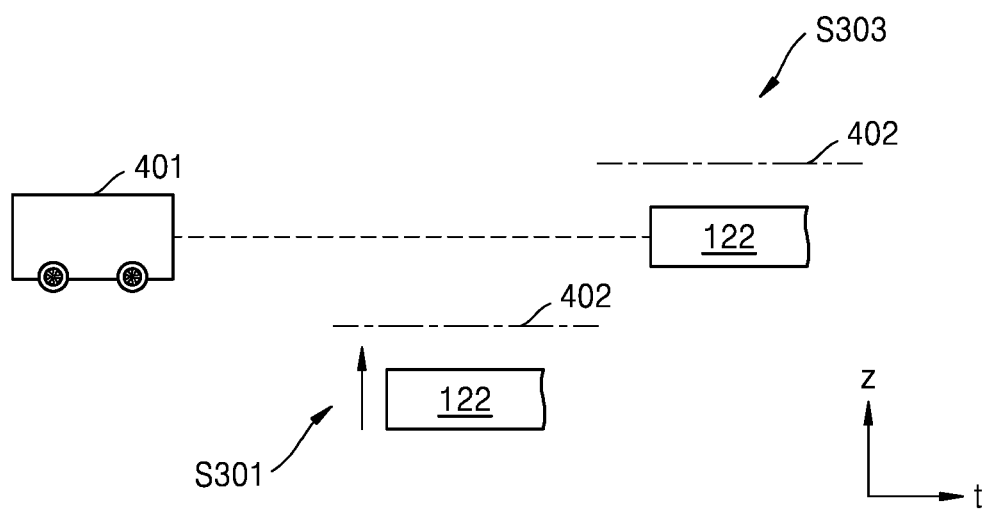
FIG. 4 is a diagram for describing an example of operations S301 and S303 in FIG. 3 according to an embodiment.
Figure 5:
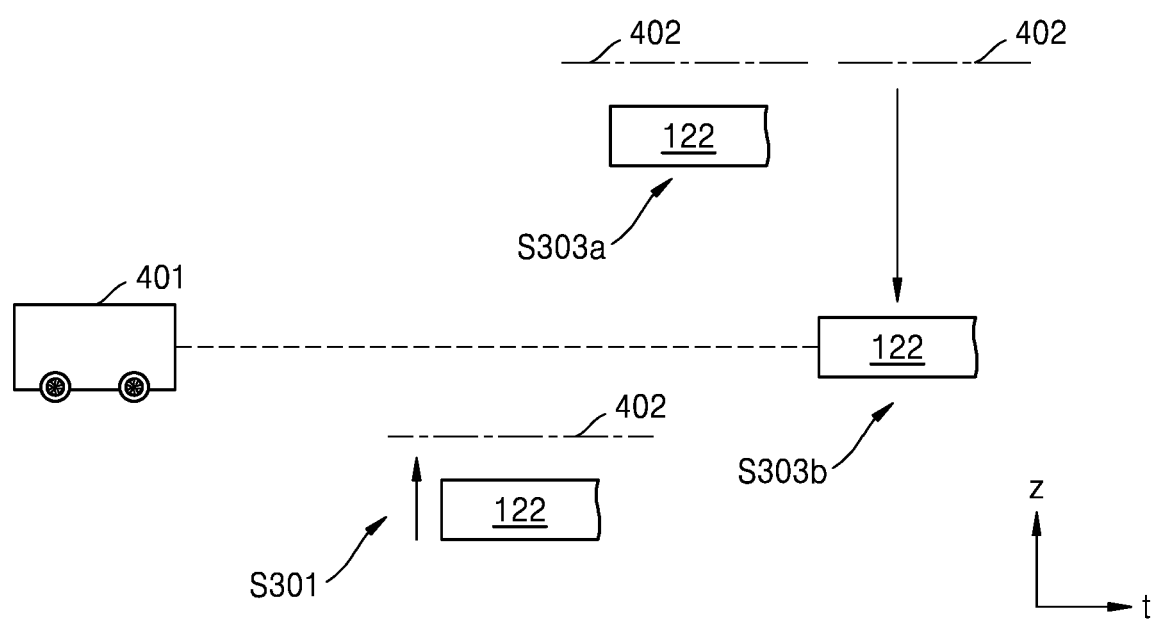
FIG. 5 is a diagram for describing an example of operations S301 and S303 in FIG. 3 according to another embodiment.
Figure 6:
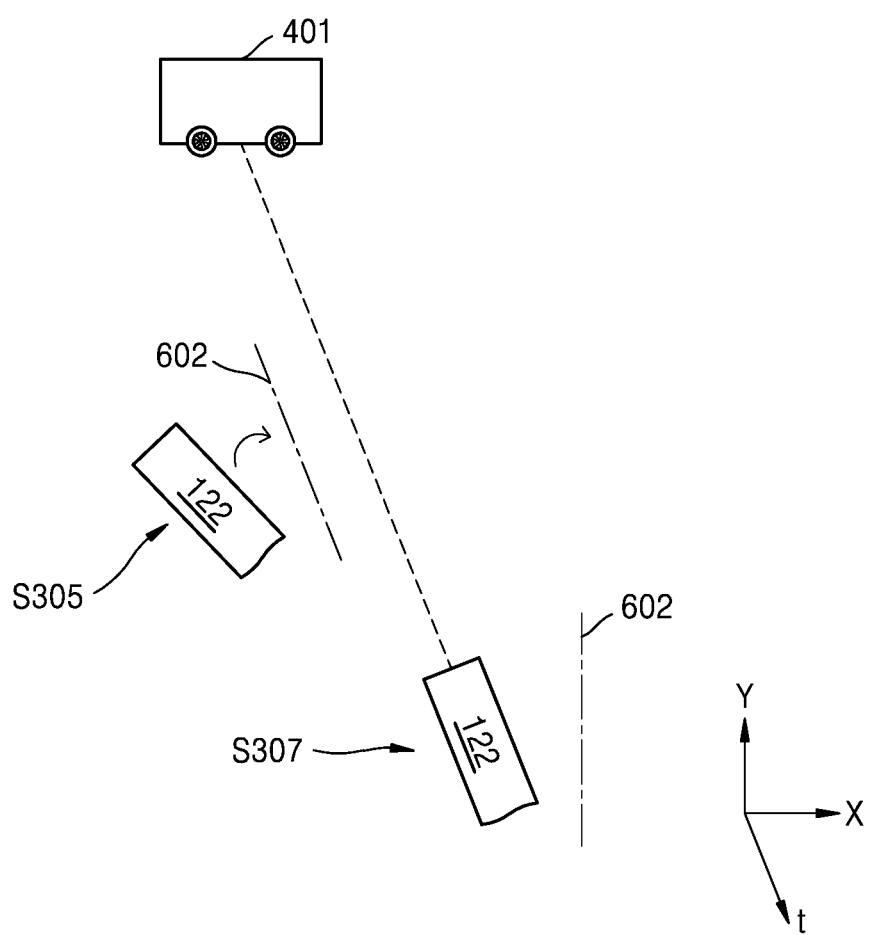
FIG. 6 is a diagram for describing an example of operations S301 and S303 in FIG. 3 according to yet another embodiment.
Figure 7:
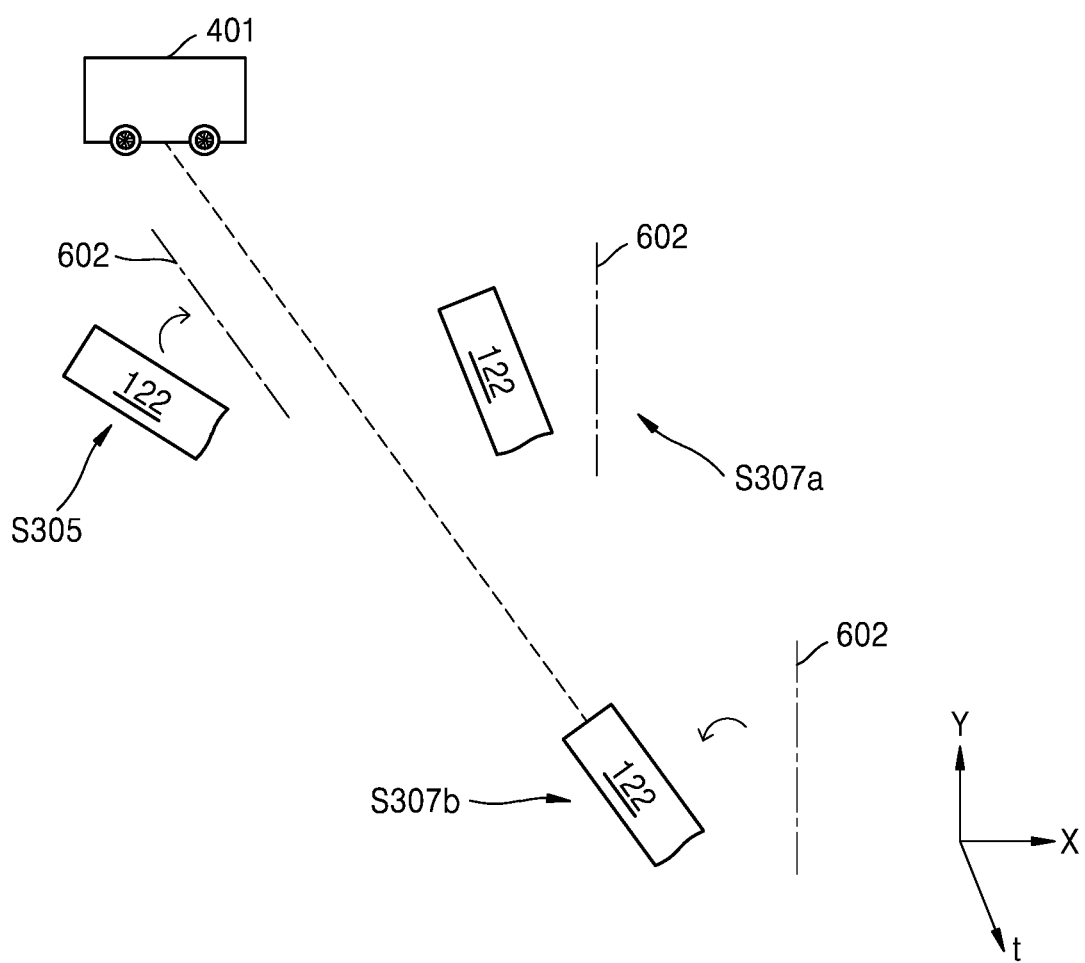
FIG. 7 is a diagram for describing an example of operations S301 and S303 in FIG. 3 according to still yet another embodiment.

FIG. 4 is a diagram for describing a first example of operations S301 and S303 in FIG. 3. FIG. 5 is a diagram for describing a second example of operations S301 and S303 in FIG. 3. FIG. 6 is a diagram for describing a third example of operations S301 and S303 in FIG. 3. FIG. 7 is a diagram for describing a fourth example of operations S301 and S303 in FIG. 3. In FIGS. 4 to 7, the reference X denotes the traverse axis of the gun 122 or the platform 121 in FIG. 1, the reference Y denotes the sagittal axis thereof, the reference Z denotes the vertical axis thereof, and the reference t denotes the time-axis. The detailed operation of the restricted-area resolving mode (operation S205) will be described with reference to FIGS. 3 to 7.

The controller 123 determines whether it is a situation in which a movement of the barrel of the gun 122 is about to be stopped by a mechanically movement-restricted area (above 402) while the barrel of the gun 122 is being moved in the vertical axis (Z-axis) to follow a target 401 (operation S301). Here, it may be determined whether it is a situation in which the movement is stopped instead of a situation in which the movement is about to be stopped.

In the case of the situation in which the movement is about to be stopped (or the situation in which the movement is stopped), the controller 123 provides movement control signals to the platform driver 124 in FIG. 1, such that the platform 121 is raised or lowered in a direction in which the barrel of the gun 122 moved (operation S303).

Accordingly, referring to FIGS. 1 and 4, since the platform 121 is raised by the platform driver 124 rather than the gun barrel driver 125, shooting at the target 401 may be continued while the barrel of the gun 122 is in the mechanically movement-restricted area (above 402).

Also, referring to FIGS. 1 and 5, when the barrel of the gun 122 rises higher than the target 401 due to the rise of the platform 121 (operation S303a), the barrel of the gun 122 may be lowered by the gun barrel driver 125 and shooting at the target 401 may be continued (operation S303b).

FIG. 4 is related to a case where the barrel of the gun 122 is raised in the vertical axis (Z-axis) direction, but the same may also be applied to a case in which the barrel of the gun 122 is lowered.

In operation S305, the controller 123 determines whether it is a situation in which rotation of the barrel of the gun 122 is about to be stopped due to a mechanical rotation-restricted area while the barrel of the gun 122 is rotating clockwise or counterclockwise around the vertical axis (Z-axis). Here, the controller 123 may determine whether it is a situation in which the rotation of the barrel of the gun 122 is stopped instead of the situation in which the rotation of the barrel of the gun 122 is about to be stopped.

In the case of the situation where the rotation is about to be stopped (or the situation in which the rotation is stopped), the controller 123 provides movement control signals to the platform driver 124, such that the platform 121 rotates in the direction in which the barrel of the gun 122 rotated (operation S307). In other words, if the barrel of the gun 122 is rotated in a direction such that its operation is about to be stopped or stopped, the controller 123 may transmit a control signal to the platform driver 124 so that the platform driver 124 rotates the platform in a counter direction to which the barrel of the gun 122 was rotated. As such, the barrel of the gun 122 may continue to shoot at the target without deviating from the target.

Referring to FIGS. 1 and 6, since the platform 121 is rotated clockwise by the platform driver 124 rather than the gun barrel driver 125, shooting at the target 401 may be continued while the barrel of the gun 122 is being raised with the mechanically rotation-restricted area (portion right to 602). For example, if the barrel of the gun 122 is restricted such that it can no longer be rotated clockwise in the upward direction (with respect to the Y-axis), the controller 123 may control the platform driver 124 to adjust the platform itself to rotate clockwise about the Y-axis so that the gun 122 may continue to point to and shoot at the target 401. Thus, the barrel of the gun 122 is given a wider angle to locate and shoot the target 401.

Also, referring to FIGS. 1 and 7, when the barrel of the gun 122 passed the target 401 and is overly rotated due to rotation of the platform 121 (operation S307*a*), the barrel of the gun 122 may be rotated counterclockwise by the gun barrel driver 125, and shooting at the target 410 may be continued (operation S307*b*). That is, while the platform 121 may be rotated to adjust the aim of the gun towards the target, the barrel of the gun 122 may also be rotated to adjust the aim. Accordingly, if the platform 121 is rotated clockwise so as to pass the aim of the target, the barrel of the gun 122 may rotate counterclockwise to adjust the aim toward the target 401 and continue shooting. Although described in steps, these operations may be performed simultaneously to reduce time for the adjustment.

FIGS. 6 and 7 are related to a case where the barrel of the gun 122 is rotated clockwise, but the same may also be applied to a case in which the barrel of the gun 122 is rotated counterclockwise. Therefore, descriptions related to the case in which the barrel of the gun 122 is rotated counterclockwise will be omitted.

The above descriptions of FIGS. 3 to 7 are related to the restricted-area resolving mode of S205 in FIG. 2.

In addition, there may be a situation in which it is unable to aim at a target due to obstacle situation categories (operation S204 in FIG. 2). The obstacle situation is a situation in which at least a portion of an image of an obstacle overlaps or is about to overlap an image of a target area that is set larger than an image of a target. Here, the image of the target area to be applied may be set larger than the image of the target because there is a positional deviation between a direction of the gun 122 and a direction of the camera Ca. That is, the target area to be captured by the camera Ca is set larger than the image of the target to account for any discrepancy between the point of direction of the gun 122 and the direction of the camera Ca.

The obstacle may be an external obstacle or an internal obstacle. An example of the internal obstacle may be a plurality of antennas (101 in FIG. 1) installed on the platform 121. An example of the external obstacle may be a tree blocking the target. In case of the internal obstacle, it is not preferable to shoot at the internal obstacle, and thus an image of a target area larger than an image of a target is applied to the present embodiment.

In the case of an obstacle resolving mode (operation S206 or S207 in FIG. 2), the controller 123 provides movement control signals to the platform driver 124, such that at least a portion of an image of an obstacle does not overlap an image of a target area. In the case of the internal obstacle, the controller 123 provides the movement control signals, such that the platform 121 is rotated by a set angle around the vertical axis (Z-axis).

Figure 8:
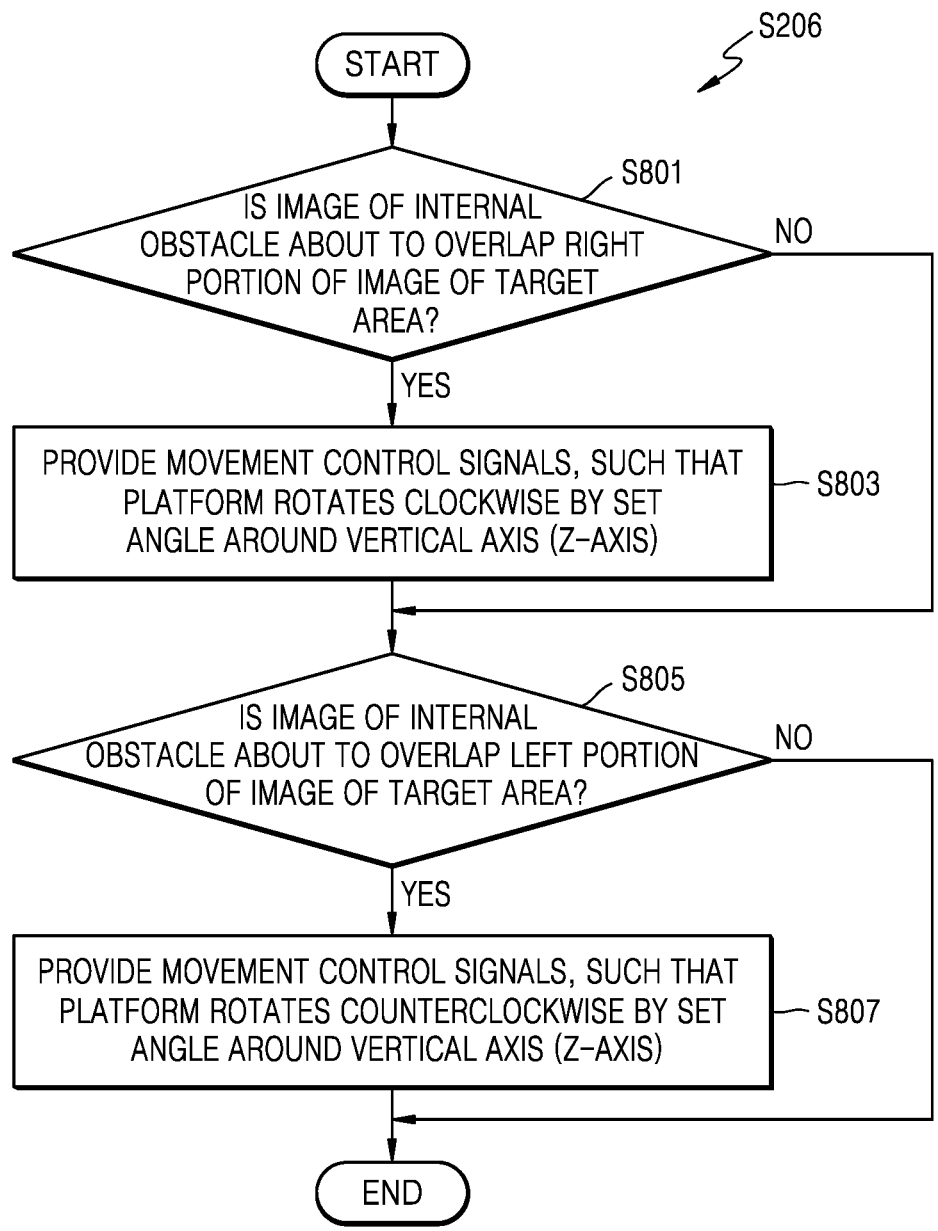
FIG. 8 is a flowchart showing a detailed operation of an internal-obstacle resolving mode of operation S206 in FIG. 2 according to an embodiment.
Figure 9:
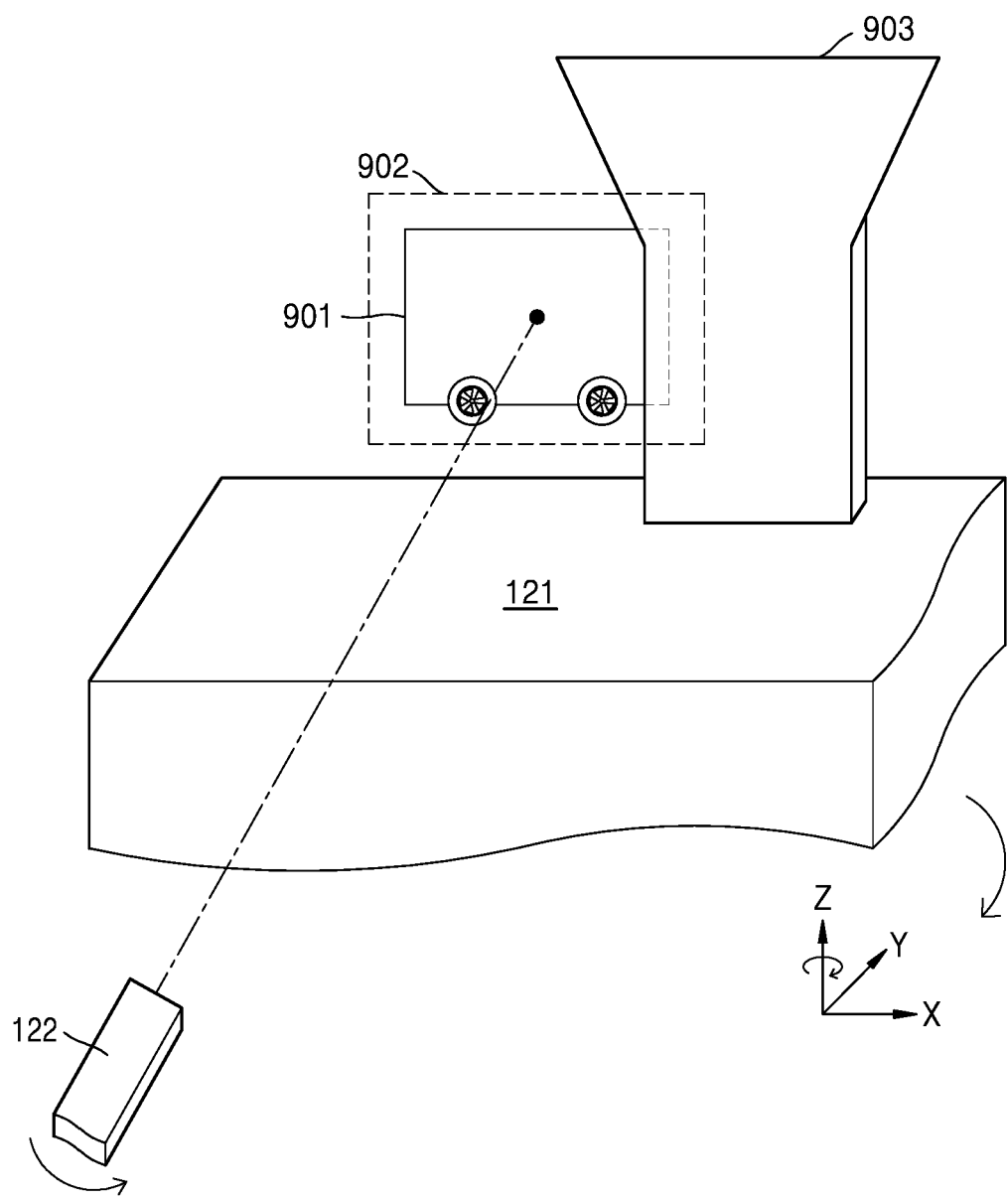
FIG. 9 is a diagram for describing an example of operations S801 and S803 in FIG. 8 according to an embodiment.

FIG. 8 is a flowchart showing the detailed operation of the internal-obstacle resolving mode in FIG. 2 (operation S206). FIG. 9 is a diagram for describing examples of operations S801 and S803 in FIG. 8. In FIG. 9, the same reference numerals as those in FIG. 1 denote the same elements. In FIG. 9, the reference numeral 901 denotes a target. The operation of the internal-obstacle resolving mode (operation S206) will be described in detail with reference to FIGS. 1, 8, and 9.

The controller 123 determines whether it is a situation in which an image of an internal obstacle 903 is about to overlap a right portion of an image of a target area 902 (operation S801). Here, the controller 123 may determine whether it is a situation in which the image of the internal obstacle 903 overlaps the right portion of the image of the target area 902 instead of the situation in which the image of the internal obstacle 903 is about to overlap the right portion of the image of the target area 902.

When it is the situation in which the image of the internal obstacle 903 is about to overlap the right portion of the image of the target area 902 (or the situation in which the image of the internal obstacle 903 overlaps the right portion of the image of the target area 902), the controller 123 provides the movement control signals, such that the platform 121 rotates clockwise by a set angle around the vertical axis (Z-axis) (operation S803).

As the gun 122 and the internal obstacle 903 rotate clockwise with the platform 121, the image of the internal obstacle 903 and the image of the target area 902 may be spaced apart from each other, but the aiming of the gun 122 also becomes off from the target. Therefore, the controller 123 controls the gun barrel driver 125 to rotate the gun 122 counterclockwise to maintain the aiming of the gun 122 (in the case of FIG. 9). Here, to increase the accuracy of shooting, the clockwise rotation of the platform 121 and the counterclockwise rotation of the gun 122 may be simultaneously performed at the same or different speed.

On the other hand, the controller 123 determines whether it is a situation in which the image 903 of the internal obstacle 903 is about to overlap a left portion of the image 902 of the target area (operation S805). Here, the controller 123 may determine whether it is a situation in which the image 902 of the internal obstacle 903 overlaps the left portion of the image 902 instead of the situation in which the image of the internal obstacle 903 is about to overlap the left portion of the image 902.

When it is the situation in which the image 903 of the internal obstacle 903 is about to overlap the left portion of the image 902 of the target area (or the situation in which the image 903 of the internal obstacle 903 overlaps the left portion of the image 902 of the target area), the controller 123 provides the movement control signals, such that the platform 121 rotates counterclockwise by a set angle around the vertical axis (Z-axis) (operation S807).

As the gun 122 and the internal obstacle 903 rotate counterclockwise with the platform 121, the image 903 of the internal obstacle and the image 902 of the target area may be spaced apart from each other, but the aiming of the gun 122 also becomes off from the target. Therefore, the controller 123 controls the gun barrel driver 125 to rotate the gun 122 clockwise to maintain the aiming of the gun 122 (in the case opposite to that of FIG. 9). Here, to increase the accuracy of shooting, the counterclockwise rotation of the platform 121 and the clockwise rotation of the gun 122 may be simultaneously performed at the same or different speed.

Figure 10:
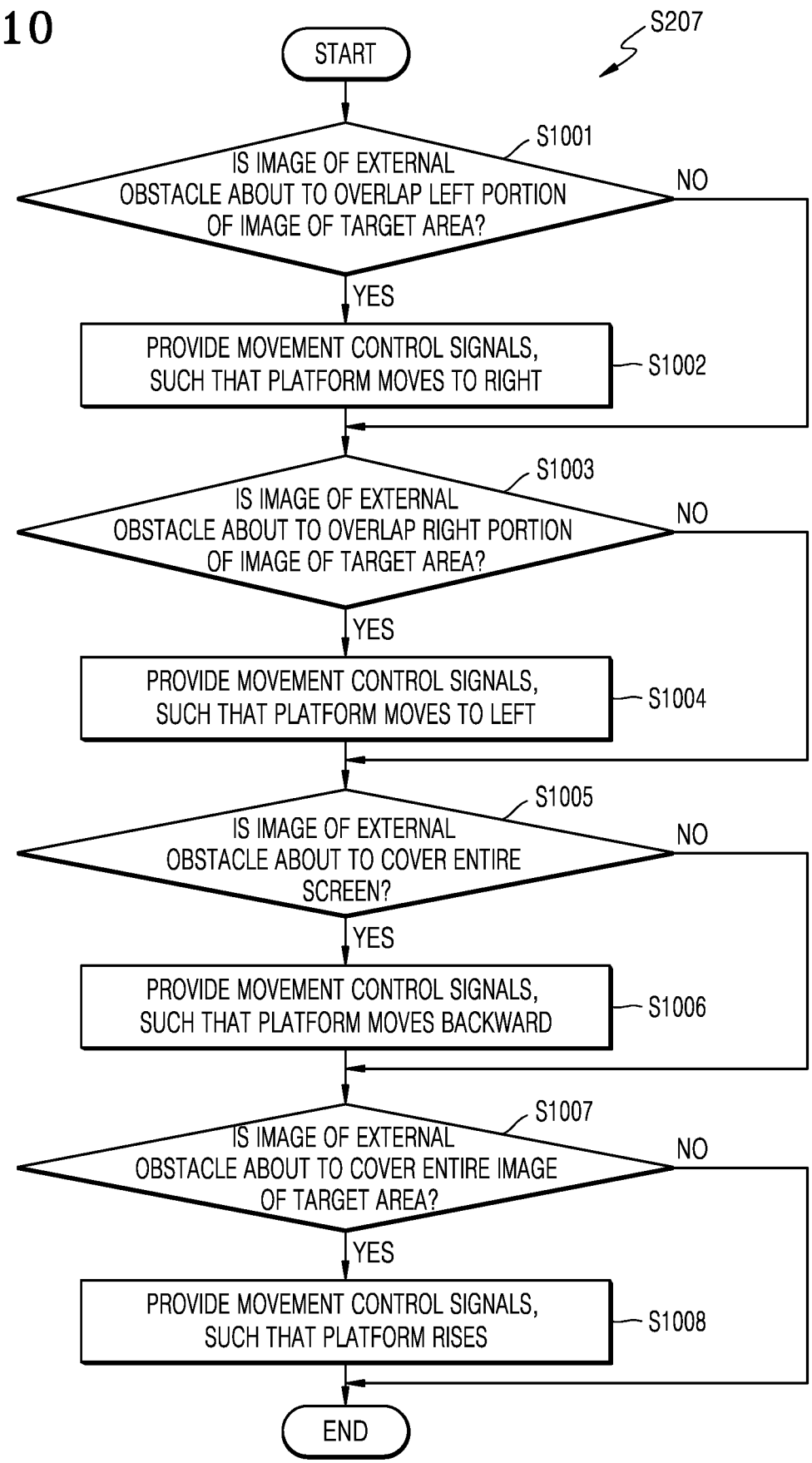
FIG. 10 is a flowchart showing a detailed operation of an external-obstacle resolving mode of operation S207 in FIG. 2 according to an embodiment.
Figure 11:
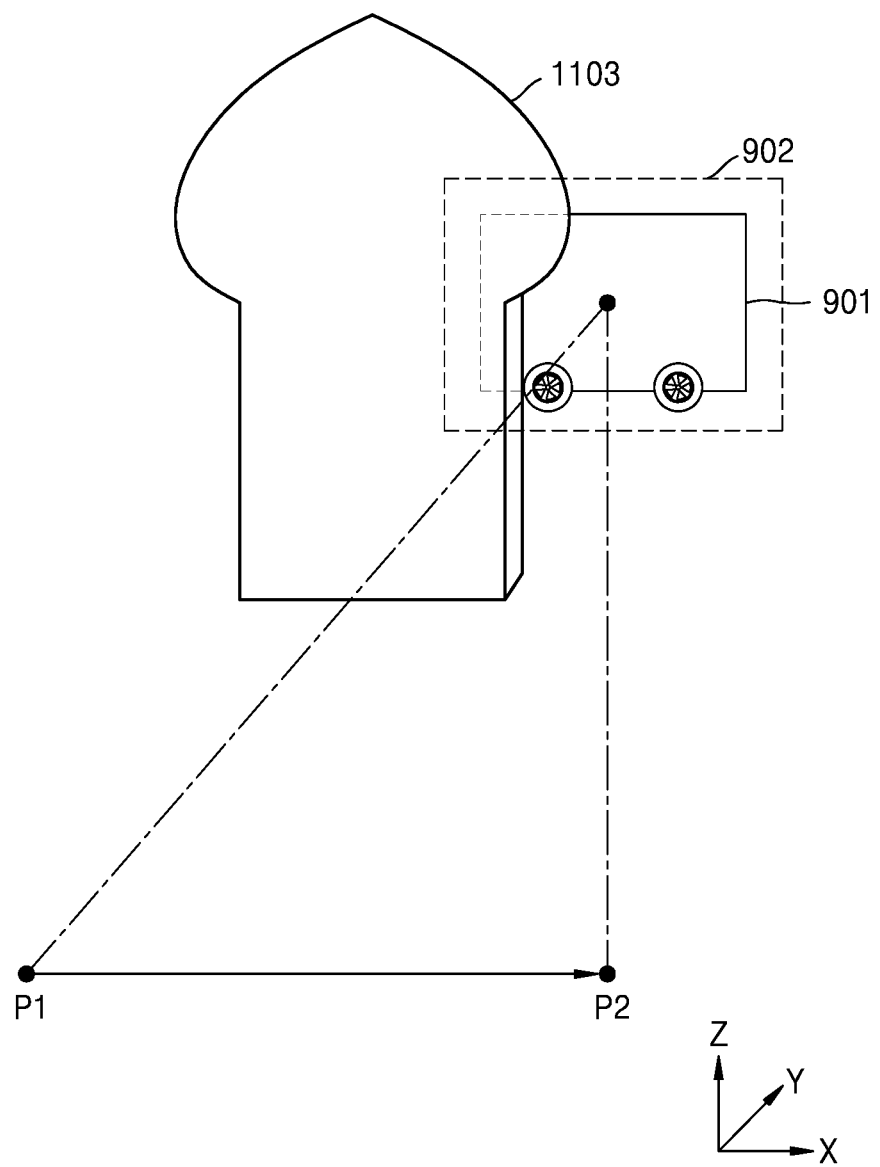
FIG. 11 is a diagram for describing an example of operations S1001 and S1002 in FIG. 10 according to an embodiment.
Figure 12:
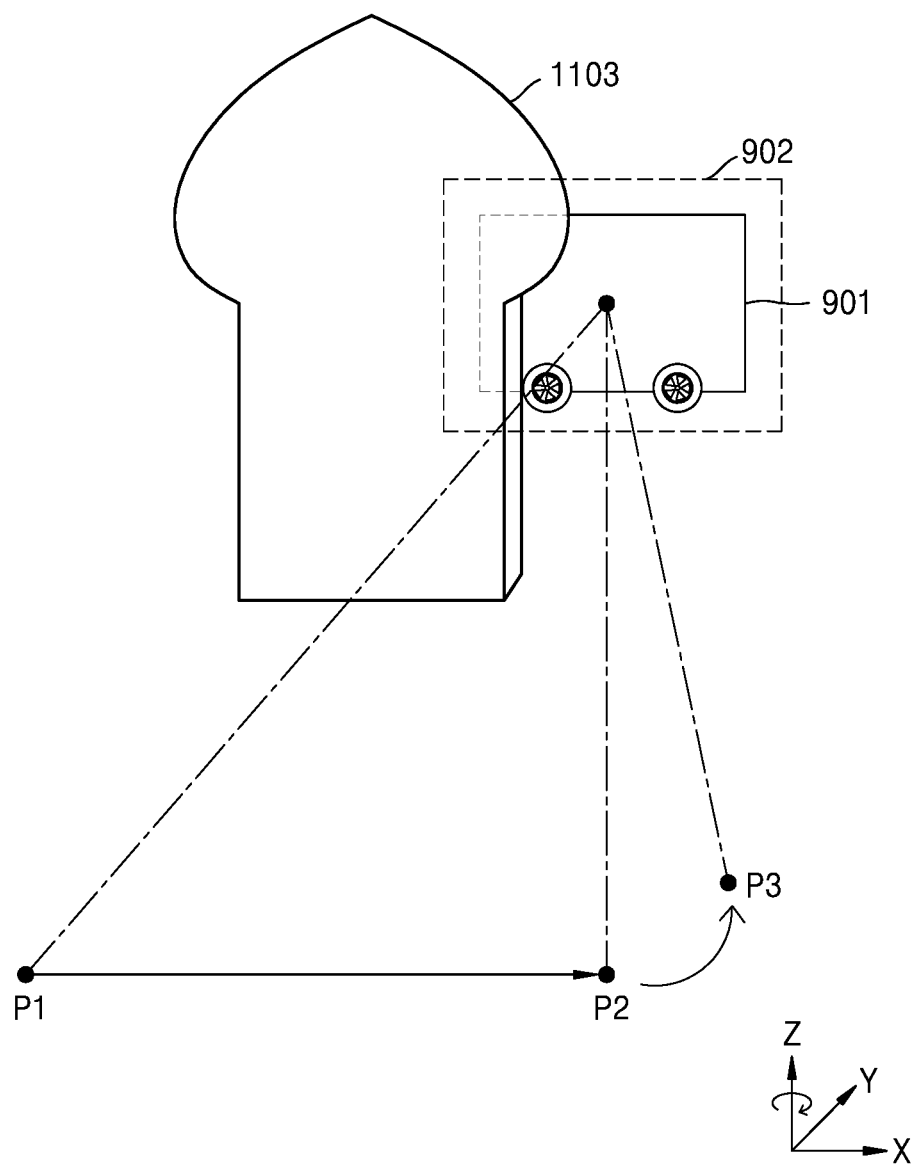
FIG. 12 is a diagram for describing an example of operations S1001 and S1002 in FIG. 10 according to another embodiment.

FIG. 10 is a flowchart showing the detailed operation of the external-obstacle resolving mode in FIG. 2 (operation S207). FIG. 11 is a diagram for describing a first example of operations S1001 and S1002 in FIG. 10. FIG. 12 is a diagram for describing a second example of operations S1001 and S1002 in FIG. 10. In FIGS. 11 and 12, the same reference numerals as those in FIG. 9 denote the same elements. FIGS. 11 and 12 illustrate an external obstacle 1103, a first position P1 of the gun 122, a second position P2 of the gun 122, and a third position P3 of the gun 122.

When an obstacle is an external obstacle 1103, the controller 123 provides the movement control signals, such that the platform 121 moves in the vertical axis (Z-axis) direction, the sagittal axis (X-axis) direction, or the traverse axis (Y-axis) direction. The operation of the external-obstacle resolving mode (operation S207) will be described in detail with reference to FIGS. 1 and 10 to 12.

For example, the controller 123 may determine whether it is a situation in which an external obstacle 1103 is about to overlap a left portion of the image 902 of the target area (operation S1001). Here, the controller 123 may determine whether it is a situation in which the external obstacle 1103 overlaps the left portion of the image 902 instead of the situation in which the external obstacle 1103 is about to overlap the left portion of the image 902.

When it is the situation in which the external obstacle 1103 is about to overlap the left portion of the image 902 (or the situation in which the external obstacle 1103 overlaps the left portion of the image 902), the controller 123 provides the movement control signals, such that the platform 121 moves to the right (operation S1002, in the case of FIG. 11). In some cases, the movement control signals may be provided, such that the platform 121 is rotated counterclockwise by a set angle around the vertical axis (Z-axis) after the platform 121 is moved to the right (in the case of FIG. 12).

On the contrary, the controller 123 determines whether it is a situation in which the external obstacle 1103 is about to overlap a right portion of the image 902 of the target area (operation S1003). Here, the controller 123 may determine whether it is a situation in which the external obstacle 1103 overlaps the right portion of the image 902 instead of the situation in which the external obstacle 1103 is about to overlap the right portion of the image 902.

When it is the situation in which the external obstacle 1103 is about to overlap the right portion of the image 902 (or the situation in which the external obstacle 1103 overlaps the right portion of the image 902), the controller 123 provides the movement control signals, such that the platform 121 moves to the left (operation S1003). In some cases, the movement control signals may be provided, such that the platform 121 is rotated clockwise by a set angle around the vertical axis (Z-axis) after the platform 121 is moved to the left.

According to an embodiment, in a case where the external obstacle 1103 is about to cover the entire screen (operation S1005, or a case where the external obstacle 1103 covers the entire screen), the controller 123 provides the movement control signals, such that the platform 121 moves backward (operation S1006).

Also, in the case where the external obstacle 1103 is about to cover the entire image 902 of the target area (operation S1007, or a case where the external obstacle 1103 covers the entire image 902 of the target area), the controller 123 provides the movement control signals, such that the platform 121 rises (operation S1006).

As described above, according to the embodiments of a shooting system, while a gun is shooting, when a situation in which the gun is unable to aim at the target occurs, the situation may be automatically and quickly resolved as a platform is appropriately moved.

Therefore, according the present embodiments, even when a situation in which it is unable to aim at a target occurs while shooting, the shooting may be continued without being interrupted.

It should be understood that the embodiments described herein should be considered in a descriptive sense and not for the purpose of limiting the scope of the embodiments of the disclosure. Descriptions of various features, aspects and advantages within each embodiment should be considered as available for other similar features or aspects in other embodiments. While one or more embodiments have been described with reference to the accompanying drawings, it will be understood by those of ordinary skill in the art that various changes in form and details may be made therein without departing from the spirit and scope of the disclosure as defined by the following claims.

What is claimed is:

1. A shooting system comprising:
a platform;
a gun installed on the platform;
a manipulator connected to the platform and the gun, and configured to move the platform;
a platform driver configured to drive the manipulator;
a controller;
a user interface configured to receive an input command from a user and transmit a command signal corresponding to the input command to the controller;
a gun barrel driver configured to drive the manipulator based on a gun barrel control signal from the controller, such that the manipulator moves a barrel of the gun in a vertical axis (Z-axis) direction or rotates about a vertical axis (Z-axis);
a shooting driver configured to drive the manipulator based on a shooting control signal from the controller, such that the manipulator controls the gun to shoot according to the shooting control signal;
a camera connected to the gun and configured to capture an image ahead of the gun and transmit the image ahead of the gun to the controller; and
a display configured to display the image ahead of the gun according to a display control signal from the controller,
wherein the controller is configured to:
control the platform driver to drive the manipulator to move the platform based on transmitting a movement control signal to the platform driver;
based on the input command from the user interface, determine a target based on the image ahead of the gun and transmit the gun barrel control signal to the gun barrel driver to control the gun to shoot the target;
determine that the gun is unable to aim at the target based on determining that a movement of the barrel of the gun is stopped or about to be stopped by a mechanically movement-restricted area while the barrel of the gun is moving in the vertical axis (Z-axis) direction; and transmit the movement control signal to the platform driver, such that the platform is raised or lowered in a direction in which the barrel of the gun is moved.

2. A shooting system comprising:

a platform;

a gun installed on the platform;

a manipulator connected to the platform and the gun, and configured to move the platform;

a platform driver configured to drive the manipulator;

a controller;

a user interface configured to receive an input command from a user and transmit a command signal corresponding to the input command to the controller;

a gun barrel driver configured to drive the manipulator based on a gun barrel control signal from the controller, such that the manipulator moves a barrel of the gun in a vertical axis (Z-axis) direction or rotates about a vertical axis (Z-axis);

a shooting driver configured to drive the manipulator based on a shooting control signal from the controller, such that the manipulator controls the gun to shoot according to the shooting control signal;

a camera connected to the gun and configured to capture an image ahead of the gun and transmit the image ahead of the gun to the controller; and a display configured to display the image ahead of the gun according to a display control signal from the controller, wherein the controller is configured to:

control the platform driver to drive the manipulator to move the platform based on transmitting a movement control signal to the platform driver;

based on the input command from the user interface, determine a target based on the image ahead of the gun and transmit the gun barrel control signal to the gun barrel driver to control the gun to shoot the target;

determine that the gun is unable to aim at the target based on determining that at least a portion of an obstacle image overlaps or is about to overlap with a target area image that is set to be larger than a target image; and transmit the movement control signal to the platform driver, such that at least the portion of the obstacle image does not overlap the target area image.

3. The shooting system of claim 2, wherein an obstacle is an external obstacle or an internal obstacle, and wherein the internal obstacle is a structure installed on the platform.

4. The shooting system of claim 3, wherein, when the obstacle is the internal obstacle, the controller is further configured to transmit the movement control signal, such that the platform rotates by a first set angle around the vertical axis (Z-axis).

5. The shooting system of claim 4, wherein the controller is further configured to:

based on determining that an image of the internal obstacle overlaps or is about to overlap a right portion of the target area image, transmit the movement control signal to the platform driver, such that the platform rotates clockwise by a second set angle around the vertical axis (Z-axis), and based on determining that the image of the internal obstacle overlaps or is about to overlap a left portion of the target area image, transmit the movement control signal to the platform driver, such that the platform rotates counterclockwise by the second set angle around the vertical axis (Z-axis).

6. The shooting system of claim 4, wherein the controller is further configured to transmit the gun barrel control signal to the gun barrel driver, such that the barrel of the gun is rotated in a direction opposite to a rotation direction of the platform and at the same speed as a rotation speed of the platform.

7. The shooting system of claim 3, wherein, when the obstacle is the external obstacle, the controller is further configured to transmit the movement control signal to the platform driver, such that the platform moves in at least one of the vertical axis (Z-axis) direction, a sagittal axis (X-axis) direction, or a traverse axis (Y-axis) direction.

8. The shooting system of claim 7, wherein the controller is further configured to:

based on determining that an image of the external obstacle overlaps or is about to overlap a left portion of the target area image, transmit the movement control signal to the platform driver, such that the platform moves to the right, and based on determining that the image of the external obstacle overlaps or is about to overlap a right portion of the target area image, transmit the movement control signal to the platform driver, such that the platform moves to the left.

9. The shooting system of claim 7, wherein the controller is further configured to:

based on determining that an image of the external obstacle covers or is about to cover an entire image, transmit the movement control signal to the platform driver, such that the platform moves backward, and based on determining that the image of the external obstacle covers or is about to cover an entire target area image, transmit the movement control signal to the platform driver, such that the platform rises.

10. The shooting system of claim 7, wherein the controller is further configured to:

based on determining that an image of the external obstacle overlaps or is about to overlap a left portion of the target area image, transmit the movement control signal to the platform driver, such that the platform rotates counterclockwise by a third set angle around the vertical axis (Z-axis) after the platform is moved to the right, and based on determining that the image of the external obstacle overlaps or is about to overlap a right portion of the target area image, transmit the movement control signal to the platform driver, such that the platform rotates clockwise by the third set angle around the vertical axis (Z-axis) after the platform is moved to the left.

* * * * *